March 9, 1948. J. S. ABER 2,437,586

PACKING GASKET AND STATIC SEAL

Filed April 4, 1946

Inventor
Joseph S. Aber,
By W. W. Williamson
Attorney.

Patented Mar. 9, 1948

2,437,586

UNITED STATES PATENT OFFICE 2,437,586

PACKING GASKET AND STATIC SEAL

Joseph S. Aber, Philadelphia, Pa., assignor of six per cent to William S. Loeb, Philadelphia, Pa.

Application April 4, 1946, Serial No. 659,604

5 Claims. (Cl. 286—26)

My invention relates to a new and useful packing gasket and static seal and is particularly adapted to be employed as a hydraulic, air, water or chemical gasket for operation in temperatures from forty degrees below to three hundred degrees above oil heat and two hundred fifty degrees above dry heat, as well as a static seal under the above conditions. While not so limited, it is desirable that the material of which the gasket and seal is composed be a composition of synthetic rubber, and be resistant to oil, gas (aromatics) and certain organic or inorganic chemicals.

One of the objects of the invention is to provide a packing gasket and static seal composed of a resilient, flexible and elastic U ring in which is seated an O ring having similar attributes. The action and principle of operation of this gasket and seal is that the pressure against the O ring is transferred to the U ring causing the latter to expand against the contiguous walls of coacting members, such as a cylinder and plunger or plunger shaft and will accommodate and seal joints against very high pressures.

Another object of this invention is to provide a gasket and seal of unique construction for use in closing a passageway between a reciprocating rod, plunger, piston and the like, and its cylinder or housing, in connection with hydraulic, air, water or chemical apparatus covering a wide range of pressures and within a considerable scope of temperatures.

A further object of the present invention is to provide a gasket and seal composed of a ring U-shaped in cross section and a second ring round in cross section and nested in the channel of the first mentioned ring. The two rings are never used separately but always in combination with one another to produce a new and novel packing action.

A still further object of this invention is to provide a U ring having a channel in either the exterior or interior circumference with an O ring positioned in the channel of the U ring.

With the above and other objects in view this invention consists of the details of construction and combination of elements hereinafter set forth and then designated by the claims.

In order that those skilled in the art to which this invention appertains may understand how to make and use the same I will describe its construction in detail referring by numerals to the accompanying drawing forming a part hereof, in which.

In carrying out the invention as herein embodied 10 represents any cylinder structure, such as the housing for a piston, in which the reciprocating plunger rod or shaft 11 operates through the neck 12 and constituting a fluid pressure mechanism.

Figure 1:
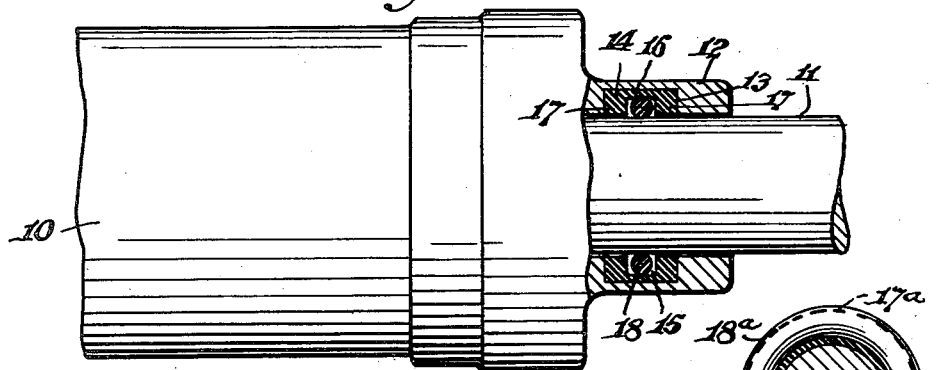
Fig. 1 is a sectional elevation of a fluid pressure mechanism including a cylinder and reciprocating rod showing an application of the invention in the cylinder or stationary member.
Figures 2, 7:
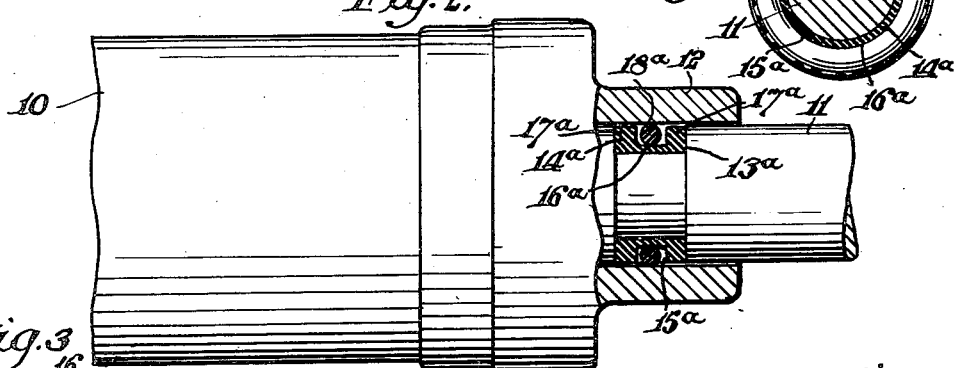
Fig. 2 is a similar view illustrating the invention as applied to the reciprocating member, such as a plunger rod or shaft.
Fig. 7 is a sectional view of the gasket and seal on a rod taken on the line 7—7 of Fig. 5.
Figure 3:
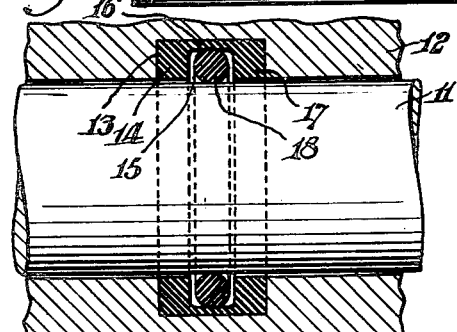
Fig. 3 is an enlarged fragmentary sectional elevation of Fig. 1 showing the gasket and seal of one form at rest or in a neutral position.
Figure 5:
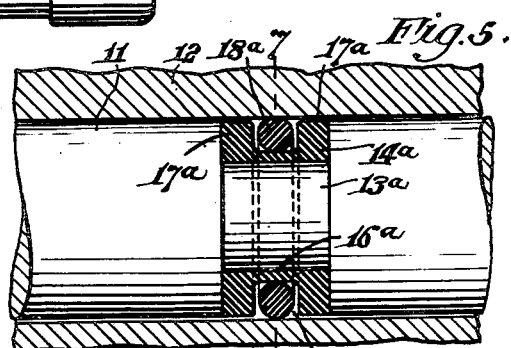
Fig. 5 is also an enlarged fragmentary sectional elevation of Fig. 2 showing the gasket and seal of the other form at rest or in a neutral position.
Figure 4:
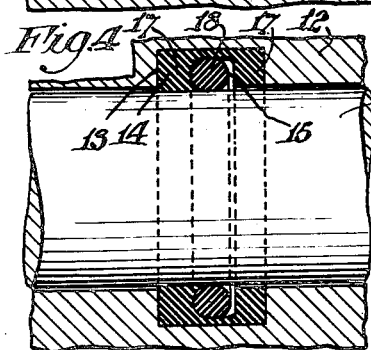
Fig. 4 is a similar view illustrating the device under pressure entering from the right hand side of the figure.
Figure 6:
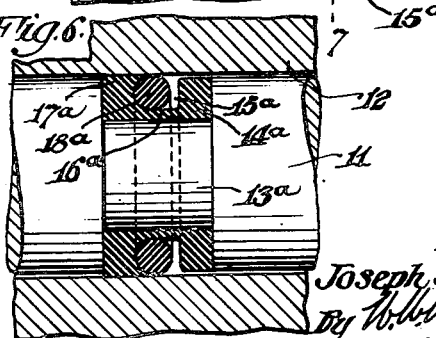
Fig. 6 is a similar view illustrating the device under pressure entering from the right hand side of the figure.

As illustrated in Figs. 1, 3 and 4, one of the members of the pressure mechanism, as the member 12, has a circumferential packing groove 13 in its inner circumference so as to surround the other member 11 and said packing groove has a flat bottom wall parallel to the axis of motion of said members. In the packing groove is fitted a U ring 14 of the packing gasket and static seal and is composed of a resilient synthetic rubber composition with the groove 15 in its inner circumference thereby forming a flat bottom wall 16 and pliable or flexible side walls 17. This U ring is normally of the same radial extent as the packing groove in the member in which it is mounted leaving a slight clearance between the edges of its side walls and the other member of the fluid pressure mechanism.

A resilient elastic composition ring 18 of normally round cross section is fitted in the groove 15 of the U ring 14 and said ring 18 is slightly narrower than the width of said groove 15 and slightly wider than the depth of said groove 15. When the gasket and seal is mounted in the packing groove 13 the nested ring 18 is compressed a fractional part of its radial dimension and expanded in its axial dimension between the members of the fluid pressure mechanism. This causes a kneading action on the nested ring 18 and rolls said ring within the groove 15 of the U ring by the movements of the members of the fluid pressure mechanism relative to each other.

When pressure is applied to the gasket and seal, the nested ring 18 is forced against the opposed side wall of the U ring, as shown in Fig. 4, which will compress the said opposed side wall axially and expand it radially thus temporarily deforming said opposed side wall and causing it to bridge the clearance space between the members of the fluid pressure mechanism and prevent passage of fluid past the position or location of the gasket and seal.

In that form of the invention illustrated in Figs. 2, and 5 to 7 inclusive, the member 11 of the fluid pressure mechanism has a circumferential packing groove 13a in its outer circumference so as to be homocentric to the other member 12 of said mechanism and said packing groove 13a has a flat bottom wall parallel to the axis of motion of said members. In the packing groove 13a is fitted a U ring 14a of the packing gasket and static seal and is composed of a resilient synthetic rubber composition with the groove 15a in its outer circumference thereby forming a flat bottom wall 16a and pliable or flexible side walls 17a. The U ring 14a is normally the same size as the packing groove 13a in the member 11 in which said U ring 14a is mounted. This leaves a slight clearance space between the edges of the side walls 17a and the other member 12 of the fluid pressure mechanism.

A resilient elastic composition ring 18a, preferably of synthetic rubber, of normally round cross section is fitted or nested in the groove 15a of the U ring 14a and said ring 18a is slightly narrower than the width of said groove 15a and slightly wider than the depth of said groove 15a. When the gasket and seal last described is mounted in place and under the influence of pressure its actions are identical with those mentioned in connection with the first described form.

From the foregoing it will be apparent that the temporary extrusion of the U ring through the medium of the nested ring due to pressure applied to said nested ring will act as a very efficient barrier against the passage of fluids of exceedingly high pressures beyond the position or location of the gasket and seal. The life of said gasket and seal will be considerably prolonged over gaskets used in a somewhat similar manner because when the pressure is removed therefrom the rings will return to their normal positions and conditions due to their inherent resiliency and elasticity.

Of course I do not wish to be limited to the exact details of construction herein shown and described as these may be varied within the scope of the appended claims without departing from the spirit of my invention.

Having described the invention what I claim as new and useful is:

1. A packing gasket and static seal structure comprised of an elastic rubber composition ring having a circumferential groove in one of its boundaries and an elastic rubber composition ring normally round in cross section and seated in the groove of the first mentioned ring, said second ring being narrower in cross section than the groove and wider than the depth of said groove.

2. A packing gasket and static seal comprising an elastic ring of rubber composition with a circumferential groove in its outer boundary, and another elastic ring of rubber composition normally round in cross section seated in said groove, said other ring being of less width than the groove and projecting outside thereof circumferentially.

3. A packing gasket and static seal comprising an elastic ring of rubber composition with a circumferential groove in its inner boundary, and another elastic ring of rubber composition normally round in cross section seated in said groove, said other ring being of less width than the groove and projecting radially outside of said groove.

4. A device of the kind described consisting of a resilient elastic composition ring having a circumferential groove in one of its boundaries and producing a flat bottom wall and side walls capable of flexion, and a second resilient elastic composition ring normally round in cross section positioned in said groove and being of such dimensions that said second ring projects beyond the edges of the side walls when in engagement with the bottom wall and when centrally in the groove will not contact the side walls.

5. In a fluid pressure mechanism, a pair of relatively movable elements, one of said elements having a packing groove with a substantially flat bottom wall parallel to the axis of motion of said elements and further having side walls, a resilient elastic composition ring positioned in said packing groove and engaging the bottom and side walls thereof, said ring having a circumferential grooved boundary facing the element opposite to the element in which such ring is positioned and providing a bottom wall and pliable side walls, a second ring of normally round cross section seated in the groove of the first ring and having a greater cross sectional diameter than the depth of said groove so that when operatively positioned between the two elements the said ring is compressed a fractional part of its radial dimension and is expanded in its axial dimension to form a static seal and when acted upon by pressure in a direction parallel to its axis it will be forced against a side wall of the first ring to extrude said side wall radially to form a barrier across the clearance space between the two elements.

JOSEPH S. ABER.

REFERENCES CITED

The following references are of record in the file of this patent:

UNITED STATES PATENTS

| Number | Name | Date |
|---|---|---|
| 402,955 | Miller | May 7, 1889 |
| 2,349,170 | Jackman | May 16, 1944 |
| 2,362,125 | Eves | Nov. 7, 1944 |
| 2,420,104 | Smith | May 6, 1947 |

FOREIGN PATENTS

| Number | Country | Date |
|---|---|---|
| 799,867 | France | 1936 |